UNITED STATES PATENT OFFICE.

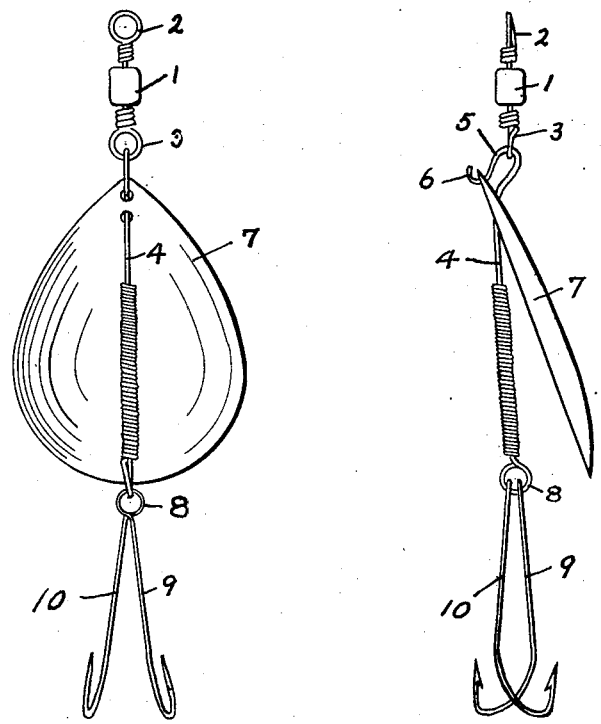

EDWARD S. KNOWLES, OF SAN FRANCISCO, CALIFORNIA; BY DECREE OF DISTRIBUTION OF ESTATE OF SAID EDWARD S. KNOWLES, DECEASED, TO MINNIE E. KNOWLES.

SPINNER FISH-LURE.

1,383,546. Specification of Letters Patent. Patented July 5, 1921.

Application filed August 9, 1919. Serial No. 316,353.

*To all whom it may concern:*

Be it known that I, EDWARD S. KNOWLES, a citizen of the United States, residing at San Francisco, in the county of San Francisco, State of California, have invented a new and useful Spinner Fish-Lure, of which the following is a specification in such full and clear terms as will enable those skilled in the art to construct and use the same.

This invention relates to a fish lure of the type known as a spinner and the object of the invention is to produce an article which will be capable of more effective results than is possible where no means is provided to prevent the spoon from becoming entangled with the line.

Another object of the invention is to prevent the spoon from spinning around without carrying the hooks around at the same time.

Another object of the invention is to provide a spinner which will always lie in a position alongside the hook to insure catching the fish when a strike is made by the fish at the spoon.

It will be understood by those skilled in the art that unless some means is provided to prevent the hook and spinner from hanging in the water in an improper relation that the spoon part of the lure will often be found turned in an opposite direction to the hook thereby causing the fish to strike at an object some distance away from the hook and thereby fail to get caught. In the present instance, the connection to the line of the hook and spinner, or spoon, is such that they will always lie close together thereby making a catch on every strike more certain.

Another object of the invention is to provide the spinner with a connection to the hooks and line which will always prevent the hooks from turning up and becoming entangled in the line.

Other objects of the invention will appear as the description proceeds.

An embodiment of the invention is shown in the drawings in which the same reference numeral is applied to the same portion throughout, but I am aware that there may be modifications thereof.

Figure 1 is a front view, and

Fig. 2 is a side elevation of the lure.

The numeral 1 indicates a swivel having links 2 and 3 revolubly connected therewith. The link 3 is connected to the rod 4 by means of a hook 5, the rod 4 passes through the spinner 7 twice and is prevented from being removed therefrom by means of the hook formed at 6.

At the lower end of the rod 4, there is formed a link 8 to which link the hooks 9 and 10 are connected.

In operation, the spinner whirls around in the water and as it turns, it carries the rod 4 around with it, the hooks turning as well.

It will also be observed that no matter whether the spinner turns up to the right or left Fig. 2, that it will always tend to carry the rod 4 along with it even with only a slight turn, while at the same time there is ample looseness. It is also very easy to attach a new set of hooks whenever desired by simply taking out the hook 5.

What I claim is as follows, but various modifications may be made in the construction shown in the drawings and above particularly described form, within the purview of my invention.

A spinner fish lure comprising a swivel, a spinner, a fish hook, and a rod having a hook at one end passing twice through the spinner and connecting the swivel and fish hook.

In testimony whereof I have hereunto set my hand this 31st day of July A. D. 1919.

EDWARD S. KNOWLES.